United States Patent
Akutsu

(10) Patent No.: US 9,732,928 B2
(45) Date of Patent: Aug. 15, 2017

(54) VEHICLE LIGHTING UNIT

(71) Applicant: Stanley Electric Co., Ltd., Tokyo (JP)

(72) Inventor: Tomoya Akutsu, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 57 days.

(21) Appl. No.: 14/823,679

(22) Filed: Aug. 11, 2015

(65) Prior Publication Data

US 2016/0053962 A1 Feb. 25, 2016

(30) Foreign Application Priority Data

Aug. 25, 2014 (JP) .................... 2014-170020

(51) Int. Cl.
*B60Q 1/26* (2006.01)
*F21S 8/10* (2006.01)
(Continued)

(52) U.S. Cl.
CPC ........ *F21S 48/2268* (2013.01); *B60Q 1/0052* (2013.01); *B60Q 1/2607* (2013.01); *F21S 48/215* (2013.01); *F21S 48/225* (2013.01); *F21S 48/2237* (2013.01); *F21S 48/2243* (2013.01); *F21S 48/2287* (2013.01);
(Continued)

(58) Field of Classification Search
CPC .. F21S 48/215; F21S 48/2237; F21S 48/2243; F21S 48/225; F21S 48/2268; F21S 48/2287; F21S 48/2293; F21S 48/1241; F21S 48/2231; F21S 48/2256; B60Q 1/0052; B60Q 1/2607; G02B 6/001; G02B 6/0036; G02B 6/0045
See application file for complete search history.

(56) References Cited

U.S. PATENT DOCUMENTS 6,036,340 A * 3/2000 Fohl .................... B60Q 1/0011
362/511
7,946,743 B2 * 5/2011 Natsume ............. B60Q 1/0041
362/509
(Continued)

FOREIGN PATENT DOCUMENTS

EP 2 071 228 A2 6/2009
JP 2006-236588 A 9/2006
(Continued)

OTHER PUBLICATIONS

The extended European Search Report for the related European Patent Application No. 15182303.6 dated Jan. 18, 2016.

*Primary Examiner* — Peggy Neils
(74) *Attorney, Agent, or Firm* — Kenealy Vaidya LLP

(57) ABSTRACT

A vehicle lighting unit can increase the light emission region of a light guiding lens to improve the aesthetic feature as the lighting unit when emitting light. The vehicle lighting unit can include an LED serving as a light source and a light guiding lens configured to guide the light from the light emitting element while totally reflect the light which are housed within a lighting chamber defined by a housing and an outer lens that can cover an opening of the housing. The light guiding lens has an aesthetic portion having a rear surface in part of which cuts are formed to cause the light to exit thereby. The aesthetic portion can further have a cut formed in a front surface where no cut is formed in the rear surface thereof.

1 Claim, 3 Drawing Sheets

(51) Int. Cl.
 *B60Q 1/00*    (2006.01)
 *F21V 8/00*    (2006.01)
(52) U.S. Cl.
 CPC ............ *G02B 6/001* (2013.01); *G02B 6/0036* (2013.01); *G02B 6/0045* (2013.01)

(56) References Cited

U.S. PATENT DOCUMENTS

| | | | |
|---|---|---|---|
| 8,333,493 B2* | 12/2012 | Taleb-Bendiab | B60Q 1/0035 362/511 |
| 9,242,594 B2* | 1/2016 | Nakada | G02B 6/002 |
| 2006/0067084 A1* | 3/2006 | Stefanov | F21S 48/2237 362/511 |

FOREIGN PATENT DOCUMENTS

| | | |
|---|---|---|
| JP | 2013-161697 A | 8/2013 |
| JP | 2013-243068 A | 12/2013 |
| WO | 2014/105424 A2 | 7/2014 |

* cited by examiner

VEHICLE LIGHTING UNIT

This application claims the priority benefit under 35 U.S.C. §119 of Japanese Patent Application No. 2014-170020 filed on Aug. 25, 2014, which is hereby incorporated in its entirety by reference.

TECHNICAL FIELD

The presently disclosed subject matter relates to a vehicle lighting unit that causes a light guiding lens to be illuminated with light emitted from a light emitting element.

BACKGROUND ART

A rear combination lamp to be disposed in a rear portion of a vehicle body on either side has been known to include a plurality of types of lamps having different functions within a lighting chamber defined by a housing and an outer lens that covers the opening of the housing. Such lamps having different functions may include a tail lamp, a turn indicator lamp, a back-up lamp, and the like.

Such a rear combination lamp is demanded to be reduced in size. In order to do so, some rear combination lamps have been configured to employ a light emitting element such as a light emitting diode (LED) as at least one of the plurality of types of lamps, for example, as a light source for a tail lamp. In these lamps, further employed is a light guiding lens that is configured to guide light emitted from the light emitting element to be illuminated with the light, as if the light guiding lens itself can emit light. This type of lighting unit can be found in a publication of Japanese Patent Application Laid-Open Nos. 2013-161697 and 2013-243068.

FIG. 1 is a cross-sectional view illustrating part of a vehicle lighting unit that causes a light guiding lens to be illuminated with light emitted from a light emitting element. The light guiding lens 111 can have an aesthetic portion 111B and cuts 111b formed in a rear surface of the aesthetic portion 111B. The light guided through the light guiding lens 111 while totally reflected by the inner surface of the light guiding lens 111 can be reflected by the cuts 111b to exit through the surface (light exiting face) of the light guiding lens 111. By doing so, the aesthetic portion 111B of the light guiding lens 111 can be illuminated with light when it is viewed from its front side as if the aesthetic portion 111B itself emit light.

In the light guiding lens 111 illustrated in FIG. 1, since the region r1 of the light guiding lens 111 is a thick portion, lens cuts 111b provided in the rear surface of the aesthetic portion 111B cannot be extended from the formed lens cut 111b and formed within that region r1 for taking out the light through the front surface of the region r1. When the aesthetic portion 111B of the light guiding lens 111 has a largely curved portion, any cuts 111b cannot be formed in the inner surface of the region r2 illustrated in FIG. 1 due to the design of a metal mold to be used for molding the light guiding lens 111. Accordingly, the light is totally reflected at the regions r1+r2 where any cuts 111b are not formed in the rear surface thereof, and thus, the light cannot exit through these regions and the light emission region is narrowed to deteriorate the aesthetic feature as the lighting unit when emitting light.

SUMMARY

The presently disclosed subject matter was devised in view of these and other problems and features and in association with the conventional art. According to an aspect of the presently disclosed subject matter, a vehicle lighting unit can increase the light emission region of a light guiding lens to improve the aesthetic feature as the lighting unit when emitting light.

According to another aspect of the presently disclosed subject matter, a vehicle lighting unit can include a housing having an opening; an outer lens that can cover the opening of the housing to define a lighting chamber together with the housing; a light emitting element serving as a light source; and a light guiding lens having a front surface and a rear surface in part of which a cut is formed and including an aesthetic portion. In the vehicle lighting unit, the lighting chamber contains the light emitting element and the light guiding lens, and the light guiding lens is configured to guide the light emitted from the light emitting element while totally reflecting the light to cause the light to exit the light guiding lens by the cuts. The light guiding lens can be configured such that a cut can be formed in a front surface of the aesthetic portion at a portion where no cut is formed in the rear surface thereof.

In the vehicle lighting unit with the above configuration, the light guiding lens can include a horizontal portion and the aesthetic portion. The horizontal portion can include a light incident surface on which the light emitted from the light emitting element can be incident. The aesthetic portion can have a curved portion which is connected to the horizontal portion and in which the cut formed in the front surface is formed.

In the vehicle lighting unit with the above configuration, even when the rear surface of the aesthetic portion includes cuts formed in part and does not include cuts in other part where cuts cannot be formed in the rear surface, cuts can be formed in the front surface of the aesthetic portion at the portion where no cut is formed in the rear surface thereof. Therefore, the cuts in the front surface can cause the light to be transmitted therethrough and deflected thereby to exit the light guiding lens therethrough, whereby the part of the aesthetic portion where no cut is formed in its rear surface can be illuminated with light passing therethrough. This configuration can increase the light emission region of the light guiding lens to improve the aesthetic feature as the lighting unit when emitting light.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to a vehicle lighting unit of the presently disclosed subject matter with reference to the accompanying drawings in accordance with exemplary embodiments.

Figure 2:
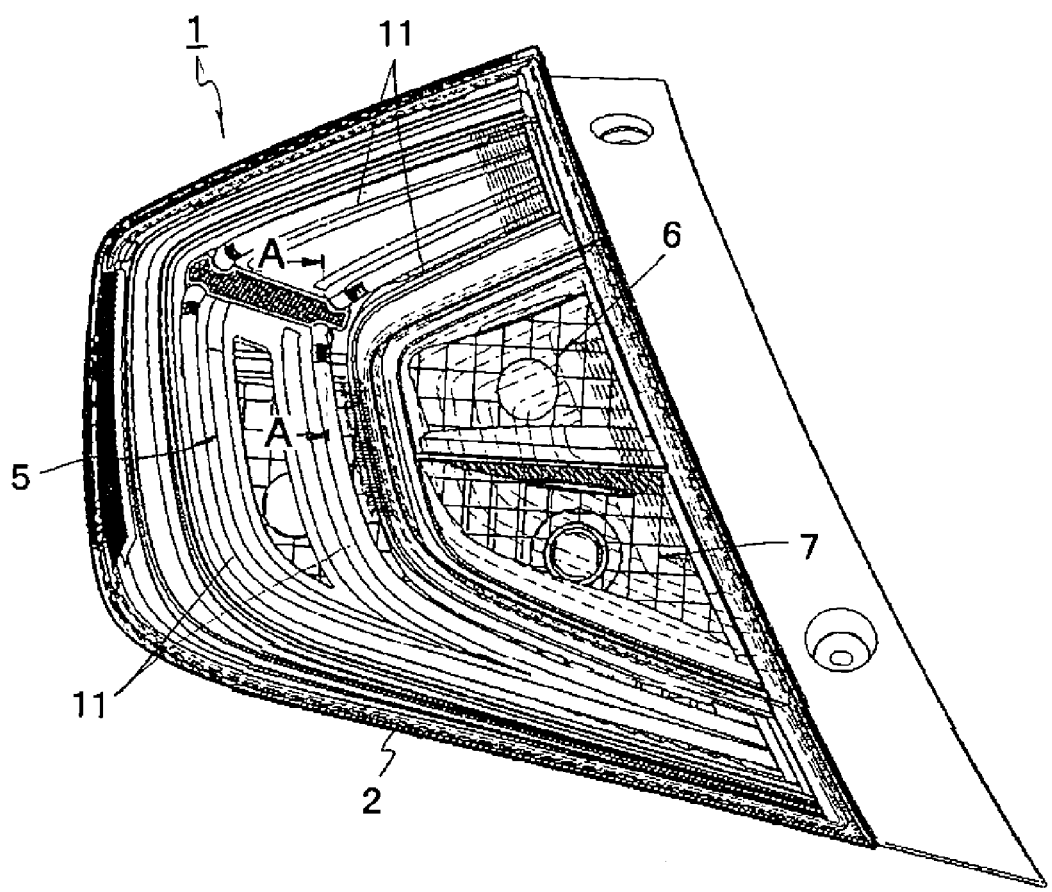
FIG. 2 is a front view of a rear combination lamp as a vehicle lighting unit made in accordance with principles of the presently disclosed subject matter.
Figure 3:
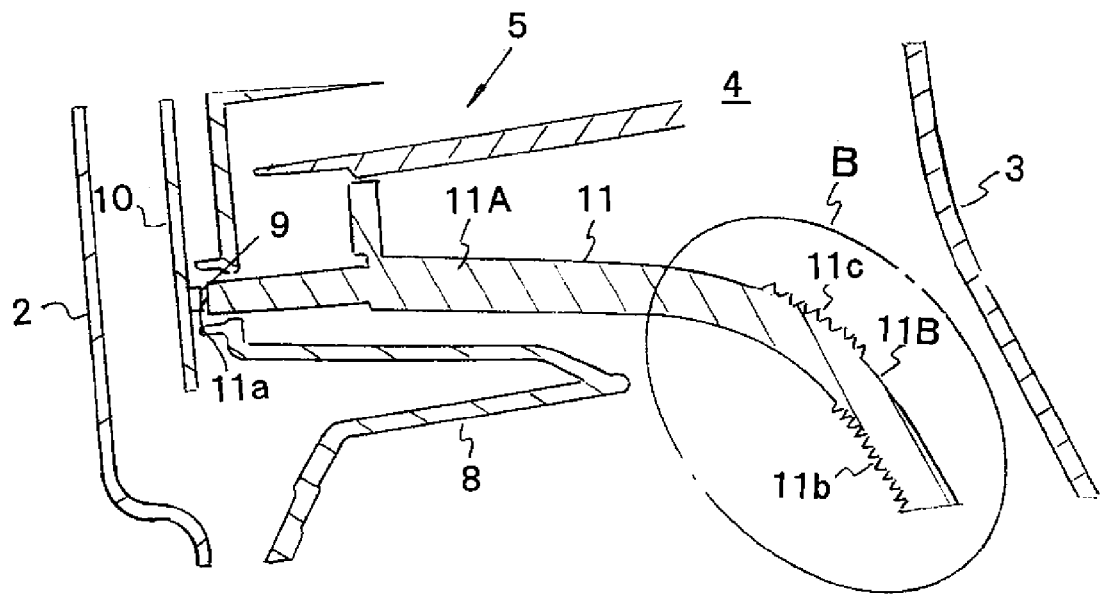
FIG. 3 is a cross-sectional view of the rear combination lamp taken along line A-A in FIG. 2 and including a portion B.
Figure 4:
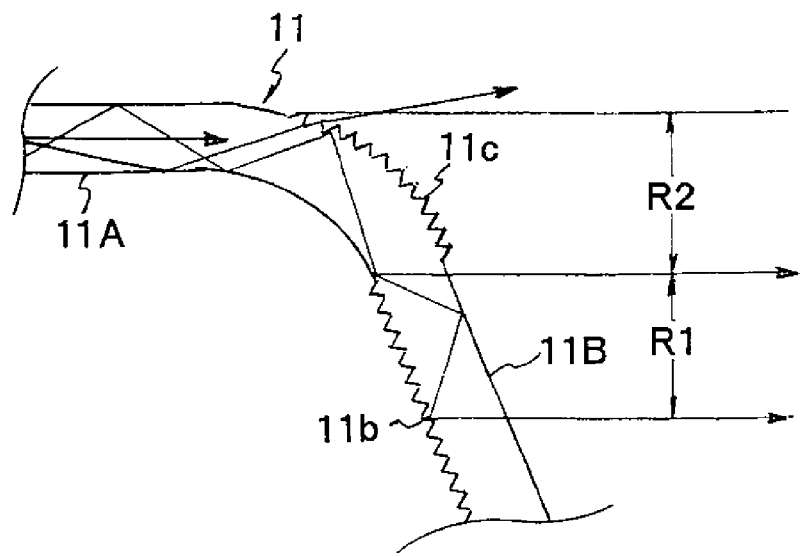
FIG. 4 is an enlarged view of the portion B in FIG. 3 in detail.

FIG. 2 is a front view of a rear combination lamp as one embodiment of the vehicle lighting unit made in accordance with principles of the presently disclosed subject matter, FIG. 3 is a cross-sectional view of the rear combination lamp taken along line A-A in FIG. 2, and FIG. 4 is an enlarged view of the portion B in FIG. 4 in detail. In general, an automobile can include rear combination lamps on respective right and left sides of the rear portion of a vehicle body and thus the rear combination lamps on the respective right and left sides have the same symmetric structure. Thus, in the following description, only a rear combination lamp on the left side will be illustrated and discussed.

The rear combination lamp 1 made in accordance with the principles of the presently disclosed subject matter can be disposed on the left side of the rear part of a vehicle body as illustrated in FIG. 2, and can include a housing 2 having an opening; and an outer lens 3 that can cover the opening of the housing 2 to define a lighting chamber 4 (as illustrated in FIG. 3) together with the housing 2. The lighting chamber 4 can contain a plurality of lamps with different functions, such as a tail lamp 5, a turn indicator lamp 6, and a back-up lamp 7, and an extension 8 covering the peripheries of these tail lamp 5, turn indicator lamp 6, and back-up lamp 7. These parts can be integrally configured with each other.

In this rear combination lamp 1 with the above-configuration, the turn indicator lamp 6 and the back-up lamp 7 can each employ a not-illustrated bulb as a light source, and can be disposed on upper and lower sides, respectively, and on an inner side (side closer to the center) of the vehicle body (on the right side of FIG. 2). The tail lamp 5 can employ an LED 9 as a light source as illustrated in FIG. 3, and can be disposed on an outer side (side farther from the center) of the vehicle body to surround the turn indicator lamp 6 and the back-up lamp 7 from their outer sides.

As illustrated in FIG. 3, the LED 9 as the light source for the tail lamp 5 can be mounted on a planar substrate 10 substantially vertically erected. In the present exemplary embodiment, the LED 9 is used as the light source for the tail lamp 5, but other light emitting elements such as an organic EL element, and the like can be employed.

The tail lamp 5 can further include a light guiding lens 11 that is illuminated with the light emitted from the LED 9 as if the light guiding lens 11 itself can emit light. The light guiding lens 11 can be formed from a transparent resin such as an acrylic resin, a polycarbonate resin, and the like, and molded in a round bar shape. As illustrated in FIG. 3, the light guiding lens 11 can include a horizontal portion 11A extending substantially in a horizontal direction along the optical axis of the LED 9 and in a rearward direction of the vehicle body (rightward in FIG. 3), and an aesthetic portion 11B extending from the end of the horizontal portion 11A (right end in FIG. 3) obliquely downward while curved in an arc shape. The horizontal portion 11A of the light guiding lens 11 can have an end face that faces to the LED 9 and serves as a light incident surface 11a on which the light emitted from the LED 9 can be incident to enter the light guiding lens 11.

Figure 1:
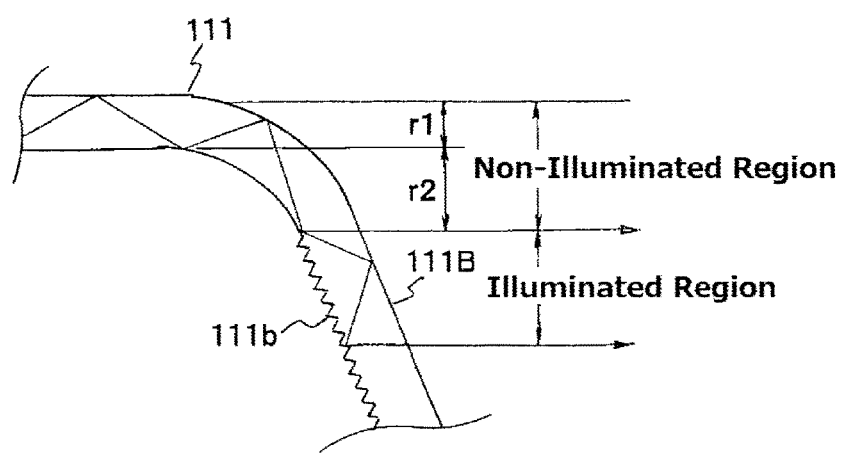
FIG. 1 is a cross-sectional view of a part of a light guiding lens of a conventional vehicle lighting unit.

Then, in the present exemplary embodiment, prism-shaped cuts 11b can be formed in the rear surface of the aesthetic portion 11B of the light guiding lens 11 in part (only in the region R1 as illustrated in FIG. 4) due to the design limitation of the metal mold for molding the light guiding lens 11, and the remaining region in the rear surface of the aesthetic portion 11B do not include any cuts 11b formed therein (the curved portion in the region R2 as illustrated in FIG. 4). In the conventional lighting unit in FIG. 1, the portion where no cut 111b is formed in the rear surface of the aesthetic portion 111B, i.e., the curved portion in the regions r1 and r2 in FIG. 1, are not illuminated with light due to total reflection in these regions, as discussed above (the light cannot exit therethrough).

To cope with this problem, the light guiding lens 11 according to the present exemplary embodiment can include prism-shaped cuts 11c formed in the front surface of the aesthetic portion 11B where no cut 11b is formed in the rear surface thereof (the curved portion in the region R2 illustrated in FIG. 4). Herein, the formed cuts 11c in the region R2 of the front surface of the aesthetic portion 11B may have the same or similar shape to the cuts formed in the rear surface thereof and may be continuously or discontinuously formed. Furthermore, the cuts 11c may preferably have continuously varied shapes according to the formed positions along the curved region R2 in order to properly direct the travelling light to the same or similar direction in which the light is directed by the cuts 111b in the rear surface according to the intended purpose or vehicle light specification.

Incidentally, although the present exemplary embodiment employs the light guiding lens 11 in a round bar shape, but the light guiding lens 11 can take a plate shape.

When the LED 9 as the light source of the tail lamp 5 in the rear combination lamp 1 with the above configuration is supplied with a current to emit light, the light emitted from the LED 9 in the optical axis direction (or a rear direction of the vehicle body) can be incident on the light incident surface 11a of the horizontal portion 11A of the light guiding lens 11 to thereby enter the light guiding lens 11. Then, the entering light can travel within the light guiding lens 11 rearward while being repeatedly totally reflected by the inner surface of the light guiding lens 11, and refracted by the cuts 11b formed in the rear surface of the aesthetic portion 11B of the light guiding lens 11 (in the region R1 as illustrated in FIG. 4) and also by the cuts 11c formed in the front surface of the aesthetic portion 11B of the light guiding lens 11 (in the region R2 as illustrated in FIG. 4), to thereby exit through the extended surface of the aesthetic portion 11B in the rearward direction of the vehicle body. Therefore, the light can exit through the portion of the aesthetic portion 11B that has not been conventionally illuminated with light, thereby causing almost the entire region of the aesthetic portion 11B to be illuminated with light. This configuration can increase the light emission region of the light guiding lens 11 to improve the aesthetic feature as the lighting unit when emitting light.

Although the above exemplary embodiment has dealt with the case where the presently disclosed subject matter is applied to the tail lamp of a rear combination lamp, the presently disclosed subject matter can be applied to any vehicle lighting units including a light guiding lens illuminated with light from a light emitting element such as an LED.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit comprising:
   a housing having an opening;

an outer lens that covers the opening of the housing to define a lighting chamber together with the housing;
a light emitting element serving as a light source; and
a light guiding lens having a front surface and a rear surface in part of which a first cut is formed and including a horizontal portion and an aesthetic portion, the lighting chamber containing the light emitting element and the light guiding lens, the horizontal portion including a light incident surface which faces the light emitting element and on which light emitted from the light emitting element is incident, the light guiding lens being configured to guide the light having entered through the light incident surface while totally reflecting the light to cause the light to exit the light guiding lens by the first cut,
wherein
the light guiding lens is formed from a transparent resin in a bar shape,
the horizontal portion is configured to extend from the light incident surface, which is located rearward away from the outer lens, toward the outer lens,
the aesthetic portion has a curved portion which is located near the outer lens and connected to the horizontal portion, and
a second cut is formed in the front surface of the curved portion of the aesthetic portion at a portion where no cut is formed in the rear surface thereof and the first cut is formed in the rear surface of the aesthetic portion except for the curved portion.

* * * * *